Figure 1:
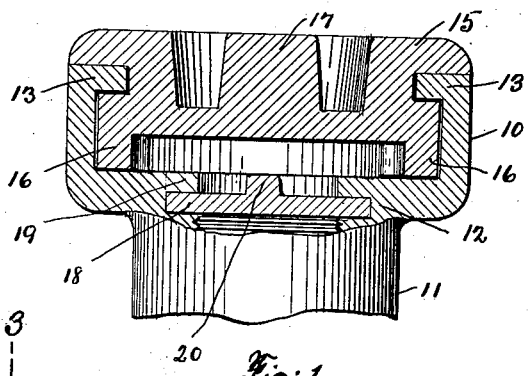

C. E. TYLER.
SURFACE BOX FOR SUBSURFACE PIPES.
APPLICATION FILED FEB. 8, 1913.

1,070,752.

Patented Aug. 19, 1913.

Witnesses:

Clarence E. Tyler, Inventor.
By his Attorney

UNITED STATES PATENT OFFICE.

CLARENCE E. TYLER, OF NEWARK, NEW JERSEY.

SURFACE BOX FOR SUBSURFACE PIPES.

1,070,752.   Specification of Letters Patent.   Patented Aug. 19, 1913.

Application filed February 8, 1913. Serial No. 747,146.

*To all whom it may concern:*

Be it known that I, CLARENCE E. TYLER, of Newark, Essex county, New Jersey, have invented a new and useful Improvement in Surface Boxes for Subsurface Pipes, of which the following is a full, clear, and exact description.

My invention relates to improvements in surface boxes for sub-surface stand pipes. In sub-surface pipes in which a valve is arranged to open and close the pipe, a stand pipe is often arranged which extends to the surface, and a surface box is fixed to the top of the stand pipe so as to effect a tight closure, and also to provide for opening the stand pipe to afford access to the valve beneath. Surface boxes for such stand pipes are used in great quantities, and there are several requirements which are absolutely essential. In the first place, the boxes must be made from castings, as cheapness is one of the first requisites. It is also necessary to provide a cover which will lock securely in place, and which can be conveniently removed when necessary, and a double cover is preferred to prevent dirt or other material from dropping into the stand pipe. In making boxes with these ends in view, it has been not unusual to use some modification of a bayonet joint, but generally there is an objection to this arrangement because it is difficult to get castings smooth enough so that the joints will work properly, unless they are machined to a certain extent, and this means expense.

The object of my invention is to produce a cheap, strong, reliable surface box of the kind specified, in which all the parts can be conveniently cast, and which while using a modification of the bayonet joint principle, has a double arrangement of cams of opposite pitch and opposed so that the cover which is put in place will be securely locked by giving it a half turn, even though no machine work is done on the cover, because by the double arrangement of cams referred to, and more specifically described, one is certain to act even though the other may be a poor fit, and so the locking parts are sure to be properly placed. Thus I am able to conserve the necessary requirements of cheapness, durability, convenience, and strength.

Reference is to be had to the accompanying drawings forming a part of this specification, in which similar reference characters indicate corresponding parts in all the views.

Figure 2:
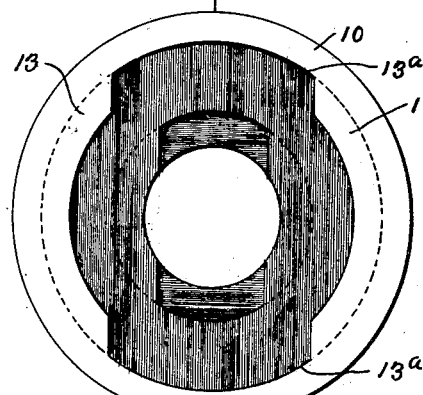
Figure 5:
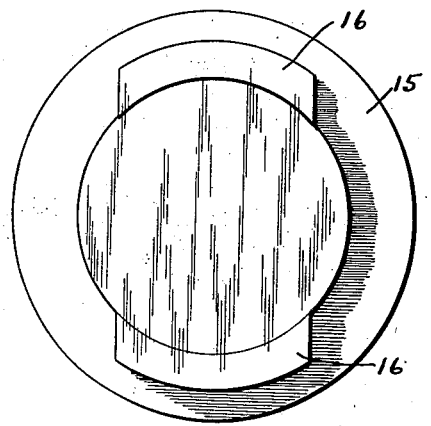
Figure 3:
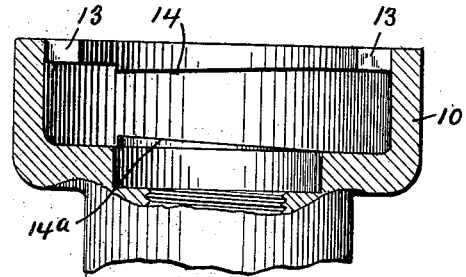
Figure 4:
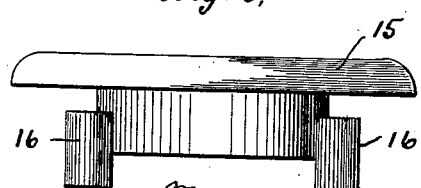

Figure 1 is a sectional elevation of a surface box and cover showing my improvements. Fig. 2 is a plan view of the box with the cover removed. Fig. 3 is a sectional view on the line 3—3 of Fig. 2. Fig. 4 is a detail side elevation of the cover, and Fig. 5 is an inverted plan view of the cover.

The box 10 is in its exterior shape, substantially like ordinary surface boxes of this character, and has a reduced lower portion 11 adapted to receive the upper end of the stand pipe. Where the reduced part 11 merges into the top portion 10, a recess 12 is provided in which a small cover can be dropped if desired. At the top of the box 10 and on opposite sides, are in-turned flanges 13 the space between them being cut away as shown at 13$^a$ to the full diameter of the box, and the flanges 13 have on the under side cam surfaces 14, as shown clearly in Fig. 3.

The cover 15 is adapted to lie flush on the top of the box 10, and it has on the lower edge and opposite sides, lugs 16 which are shaped to drop through the spaces 13$^a$ shown in Fig. 2, and then be turned beneath the flanges 13 so as to pull the cover down tight upon the box top and effect a tight closure. If, however, the arrangement above described were used separately, a tight joint could not be relied on unless the cam surfaces 14 and the corresponding parts of the lugs 16 were machined so as to meet smoothly and with a fair degree of accuracy. To obviate this difficulty, however, I arrange on the floor of the box 10 and immediately below the cam surfaces 14, opposite surfaces 14$^a$ which are of opposite pitch to the parts 14. With this arrangement it will be seen that when the cover 15 is dropped into place and given a half turn as described, then there can be some freedom or play, and yet the surfaces 14 will force the lugs 16 snug up against the surfaces 14$^a$, and between the two cam surfaces 14 and 14$^a$ the lugs 16 are certain to become securely fastened so that the cover is held locked in place.

To provide for turning the cover 16, it has the customary wrench engaging lug 17 on the top.

Referring to Fig. 4, it will be seen that the lugs 16 extend laterally from the body portion of the cover 15, but lie inside the peripheral edge of the cover, so that they can be dropped readily into the box. They also extend a little below the bottom portion of the cover, as the drawing shows, thus lightening the cover and bringing the lugs into the correct position to engage the cam surfaces 14 and 14ª.

In some cases it is desirable to have an inner cover which will lock in place, and as shown in Fig. 1, this cover 18 can be substantially like the cover 15, and can be arranged to lock beneath lugs 19, as the drawing shows. A suitable nut 20 is provided which can be engaged by a wrench. Thus a double lock is provided so that in case of displacement of the outer cover, the inner one still closes the part 11. The inner cover can of course be used with another form of lock if desired, or without any lock, but I prefer to use the lock illustrated and described.

I claim:—

1. A surface box of the kind described having inturned flanges at the top, said flanges being spaced apart and provided with cam surfaces on their under sides, cams on the inner part of the box beneath the first mentioned cam surfaces, the second or lower cam surfaces being of opposite pitch to the upper cams, and a cover shaped to lie on the box top and having a middle portion extending downward into the box, the said middle portion carrying lateral lugs adapted to drop between the aforesaid flanges of the box and turn between the upper and lower cam surfaces of the box.

2. A surface box of the kind described having upper and lower cam surfaces of opposite pitch, the upper and lower cam surfaces being arranged opposite each other, and the upper cams being spaced apart, in combination with a cover having a middle portion adapted to extend downward into the box, said middle portion having lateral lugs adapted to drop between the upper cam surfaces and be turned between the upper and lower cam surfaces.

3. A surface box of the kind described having a lower extension to connect with a sub-surface pipe, said lower extension having a recess around the opening therethrough, an inner cover shaped to fit in the recess, means for locking the inner cover in place, upper and lower cams surfaces on the inner part of the box, the said upper and lower cam surfaces being placed one above the other, and the upper cams being spaced apart, and a cover adapted to lie on the box top and having a middle portion extending downward into the box, said middle portion having lugs adapted to turn into position between the upper and lower cam surfaces of the box.

4. A surface box of the kind described comprising a generally cylindrical box open at the top and with a lower middle extension to connect with a pipe, said box having at the top inturned flanges spaced apart and with cam surfaces on the under sides, said box having also a second set of cam surfaces below the upper cam surfaces and of opposite pitch, in combination with a cap or cover which lies on the box top and has lateral lugs adapted to drop between the upper cam surfaces and be turned into position between the upper and lower cam surfaces, thereby locking the cover.

CLARENCE E. TYLER.

Witnesses:
REGINA E. HEILPERN,
ARTHUR G. DANNELL.